United States Patent
Harada et al.

(10) Patent No.: US 10,027,265 B2
(45) Date of Patent: Jul. 17, 2018

(54) INVERTER CONTROL DEVICE AND INVERTER CONTROL METHOD

(71) Applicant: Mitsubishi Electric Corporation, Tokyo (JP)

(72) Inventors: Shingo Harada, Tokyo (JP); Keiichi Enoki, Tokyo (JP); Masutaka Watanabe, Tokyo (JP); Yoshimasa Nishijima, Tokyo (JP); Yasukazu Murata, Hyogo (JP); Michitaka Fujiwara, Hyogo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/637,428

(22) Filed: Jun. 29, 2017

(65) Prior Publication Data

US 2018/0138844 A1     May 17, 2018

(30) Foreign Application Priority Data

Nov. 14, 2016 (JP) ................................. 2016-221138

(51) Int. Cl.

| | |
|---|---|
| *H02P 27/04* | (2016.01) |
| *H02P 6/28* | (2016.01) |
| *H02M 7/5387* | (2007.01) |
| *H02P 27/08* | (2006.01) |
| *B60L 11/18* | (2006.01) |
| *H02M 1/38* | (2007.01) |

(52) U.S. Cl.
CPC ............ *H02P 6/28* (2016.02); *B60L 11/1803* (2013.01); *H02M 7/53875* (2013.01); *H02P 27/08* (2013.01); *H02M 2001/385* (2013.01)

(58) Field of Classification Search
CPC .............. H02M 2001/009; H02P 27/06; H02P 29/032; H02P 6/182
See application file for complete search history.

(56) References Cited

U.S. PATENT DOCUMENTS

2009/0251831 A1* 10/2009 Shiba ...................... B60L 3/003
361/30

FOREIGN PATENT DOCUMENTS

JP      2009-284747 A     12/2009

* cited by examiner

*Primary Examiner* — Karen Masih
(74) *Attorney, Agent, or Firm* — Sughrue Mion, PLLC; Richard C. Turner

(57) ABSTRACT

An inverter control device and inverter control method are such that, when there is a possibility of induction voltage caused by a multi-phase motor exceeding a breakdown voltage of a switching element of an inverter, two of three phases are first interrupted at an appropriate timing in order to restrict induction voltage when shifting from a three-phase short circuit to an all-phase interruption, after which a shift is made to an all-phase interruption at a timing at which currents of the three phases reach the vicinity of zero, whereby a leap in a direct current bus voltage is restricted.

7 Claims, 13 Drawing Sheets

*FIG.6*

| STATE BEFORE SHIFT | NUMBER OF PHASES INTERRUPTED | PARTIAL PHASE INTERRUPTION CONDITION | INTERRUPTED PHASE |
|---|---|---|---|
| UPPER ARM THREE-PHASE CONDUCTIVE | 1 | ONE OF THREE PHASES IS NEGATIVE (CONSTANTLY FULFILLED) | ONE NEGATIVE PHASE |
| | 2 | TWO OF THREE PHASES ARE NEGATIVE | TWO NEGATIVE PHASES |
| LOWER ARM THREE-PHASE CONDUCTIVE | 1 | ONE OF THREE PHASES IS POSITIVE (CONSTANTLY FULFILLED) | ONE POSITIVE PHASE |
| | 2 | TWO OF THREE PHASES ARE POSITIVE | TWO POSITIVE PHASES |

FIG. 11

| ELECTRICAL ANGLE θ (°) | 0-30° | 30-90° | 90-150° | 150-210° | 210-270° | 270-330° | 330-360° |
|---|---|---|---|---|---|---|---|
| U-PHASE CURRENT VALUE | − | − | + | + | + | − | − |
| V-PHASE CURRENT VALUE | + | − | − | − | + | + | + |
| W-PHASE CURRENT VALUE | + | + | + | − | − | − | + |

*FIG.12*

| STATE BEFORE SHIFT | PHASE IN PARTIAL INTERRUPTION | ALL-PHASE INTERRUPTION CONDITION (ELECTRICAL ANGLE $\theta$) (°) |
|---|---|---|
| UPPER ARM THREE-PHASE CONDUCTIVE | U-PHASE | $\theta = 180° \pm \alpha$ |
| | V-PHASE | $\theta = 300° \pm \alpha$ |
| | W-PHASE | $\theta = 60° \pm \alpha$ |
| | U-PHASE AND V-PHASE | $180° - \alpha \leq \theta \leq 180° + \alpha$ |
| | V-PHASE AND W-PHASE | $300° - \alpha \leq \theta \leq 300° + \alpha$ |
| | W-PHASE AND U-PHASE | $60° - \alpha \leq \theta \leq 60° + \alpha$ |
| LOWER ARM THREE-PHASE CONDUCTIVE | U-PHASE | $\theta = 0° (360°) \pm \alpha$ |
| | V-PHASE | $\theta = 120° \pm \alpha$ |
| | W-PHASE | $\theta = 240° \pm \alpha$ |
| | U-PHASE AND V-PHASE | $0° - \alpha \leq \theta \leq 0° (360°) + \alpha$ |
| | V-PHASE AND W-PHASE | $120° - \alpha \leq \theta \leq 120° + \alpha$ |
| | W-PHASE AND U-PHASE | $240° - \alpha \leq \theta \leq 240° + \alpha$ |

$\alpha = 0 \sim 15°$

INVERTER CONTROL DEVICE AND INVERTER CONTROL METHOD

BACKGROUND OF THE INVENTION

Field of the Invention

The present invention relates in particular to an inverter control device controlling an inverter used in a motor control device that converts direct current into alternating current, and to an inverter control method.

Description of the Related Art

A power conversion device in which an inverter is used is connected to a drive motor mounted in an electric vehicle such as an electric car or hybrid car. The power conversion device has a power converting function of converting motor-driving direct current power supplied from a direct current power supply into alternating current power, and converting alternating current power generated by the motor into direct current power for charging the direct current power supply. A switching element such as a metal-oxide-semiconductor field-effect transistor (MOSFET) is commonly used in the power conversion device in order to realize this kind of power converting function. When a voltage exceeding a predetermined breakdown voltage is applied, there is a possibility of a dielectric breakdown occurring and the switching element being damaged. Because of this, there is a need to take measures such that the voltage applied to the switching element does not exceed the breakdown voltage.

Because of this, in a case of an electric vehicle in which a permanent magnet synchronous motor is mounted, induction voltage generated because of a magnet attached to a rotor rises in accompaniment to a rise in a motor rotation speed, because of which means of restricting the induction voltage so as not to exceed the switching element breakdown voltage is provided in the power conversion device.

In, for example, Patent Document 1, as a method of restricting induction voltage applied to a switching element, a permanent magnet synchronous motor drive device has a three-phase alternating current inverter, and in particular, when a voltage applied to the switching element due to induction voltage at a time of regeneration is equal to or greater than a predetermined value, either upper arm (positive electrode side) switching elements connected to a high voltage side of a direct current bus or lower arm switching elements connected to a low voltage side (negative electrode side) of the direct current bus are all brought into a conductive (on) state, and by all three phases being in a conductive state (a three-phase conduction state), current between a motor and the inverter is caused to flow back, thereby preventing overvoltage.

CITATION LIST

Patent Literature

Patent Document 1: JP-A-2009-284747

However, the permanent magnet synchronous motor drive device of Patent Document 1 is such that the permanent magnet synchronous motor is a load in a three-phase conductive state, because of which, when the motor rotation speed decreases and the induction voltage decreases to a voltage sufficiently below the switching element breakdown voltage, a shift is made from the three-phase conductive state to an all-phase interrupted state in which the upper arm or lower arm switching elements are interrupted (off). When shifting to the all-phase interrupted state, voltage of the direct current bus leaps due to the induction voltage, as shown in FIG. 8A, and there is a problem in that there is a possibility of a state wherein the switching element breakdown voltage is exceeded occurring.

When shifting to the all-phase interrupted state, current of each of a U-phase, V-phase, and W-phase changes from the three-phase conductive state to the all-phase interrupted state, as shown in FIG. 8B.

The cause of the leap in the voltage of the direct current bus is that magnetic energy is accumulated due to a current flowing into a coil of the permanent magnet synchronous motor during three-phase conduction, and the magnetic energy passes through diodes connected in anti-parallel to the switching elements when switching from the three-phase conductive state to the all-phase interrupted state and is released on a power supply side, but the current flowing at this time is a momentary current, and becomes a high-frequency component, because of which the current is generally stored in a smoothing capacitor in an interior of an inverter with little high-frequency impedance.

SUMMARY OF THE INVENTION

The invention, having been contrived in order to resolve the heretofore described problem, has an object of providing an inverter control device and inverter control method such that, when there is a possibility of induction voltage caused by a multi-phase motor exceeding an inverter switching element breakdown voltage, the induction voltage can be restricted in order to protect the switching element.

In order to resolve the heretofore described problem, an inverter control device of the invention is characterized by including phase current detection means provided in a multi-phase motor and detecting a phase current, phase current value acquisition means that acquires a phase current value from the phase current detection means, phase current value polarity determination means that determines a polarity of the phase current value of each phase, phase current value zero determination means that determines whether or not a sum of absolute values of the phase current values of each phase is equal to or less than a predetermined value, and inverter control means that controls switching elements of an inverter that drives the multi-phase motor, wherein the inverter control means, when either one of the switching element on a positive electrode side of the inverter and the switching element on a negative electrode side is conductive, determines a phase of which the switching element is to be interrupted based on the polarity of the phase current value, interrupts the relevant switching element, and furthermore, interrupts the switching element of a remaining phase when the sum of absolute values of the phase current values of the switching elements of all phases is equal to or less than a predetermined value.

Also, an inverter control method of the invention is characterized by, when either one of a switching element on a positive electrode side of an inverter that drives a multi-phase motor and a switching element on a negative electrode side is conductive, acquiring a phase current value of the multi-phase motor, determining a phase of which the switching element is to be interrupted based on a polarity of the acquired phase current value, interrupting the relevant switching element, and furthermore, interrupting the switching element of a remaining phase when a sum of absolute values of the phase current values of the switching elements of all phases is equal to or less than a predetermined value.

According to the inverter control device and inverter control method of the invention, when shifting from a three-phase conductive state to an all-phase interruption state, a partial phase interruption wherein one or two of three phases of upper arm or lower arm switching elements, whichever are conductive, are interrupted is executed first, after which an all-phase interruption wherein the switching elements of all three phases are interrupted is executed. Because of this, current flowing to a permanent magnet synchronous motor during three-phase conductivity is caused to flow back into the motor without being caused to flow into a smoothing capacitor, whereby a leap in a direct current bus voltage due to induction voltage of the permanent magnet synchronous motor when executing all-phase interruption is restricted, and damage to the switching element can be prevented.

The foregoing and other objects, features, aspects, and advantages of the invention will become more apparent from the following detailed description of the invention when taken in conjunction with the accompanying drawings.

BRIEF DESCRIPTION OF THE DRAWINGS

FIG. 6 is a diagram showing a relationship between a partial phase interruption condition and an interrupted phase in accordance with the inverter control device according to the first embodiment;

FIG. 11 is a diagram showing a relationship between an electrical angle and phase current value polarity in a three-phase conductive state in accordance with the inverter control device according to the second embodiment; and FIG. 12 is a diagram showing a relationship between a partial phase interruption and an electrical angle of phase current in each phase in an all-phase interruption condition in accordance with the inverter control device according to the second embodiment.

DETAILED DESCRIPTION OF THE PREFERRED EMBODIMENTS

First Embodiment

Figure 1:
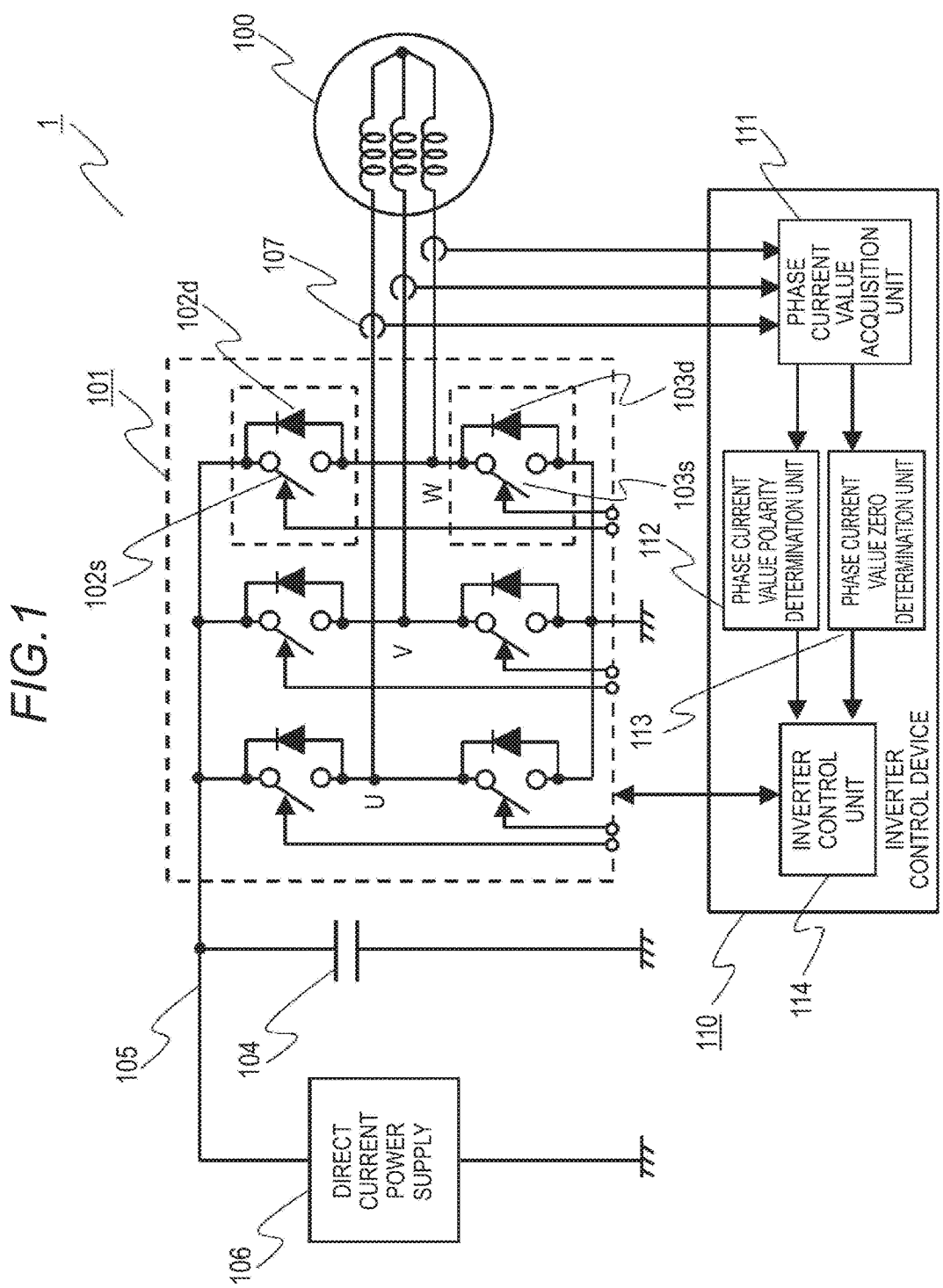
FIG. 1 is a schematic configuration diagram of a motor control system including an inverter control device according to a first embodiment of the invention.
Figure 2:
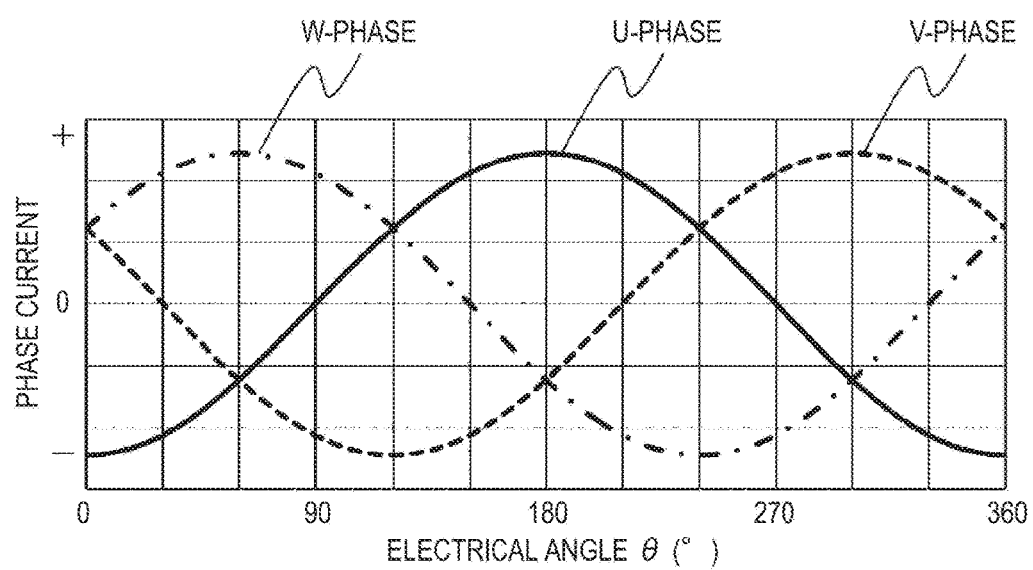
FIG. 2 is a diagram showing a relationship between electrical angle and phase current value in a three-phase conductive state.
Figure 3A:
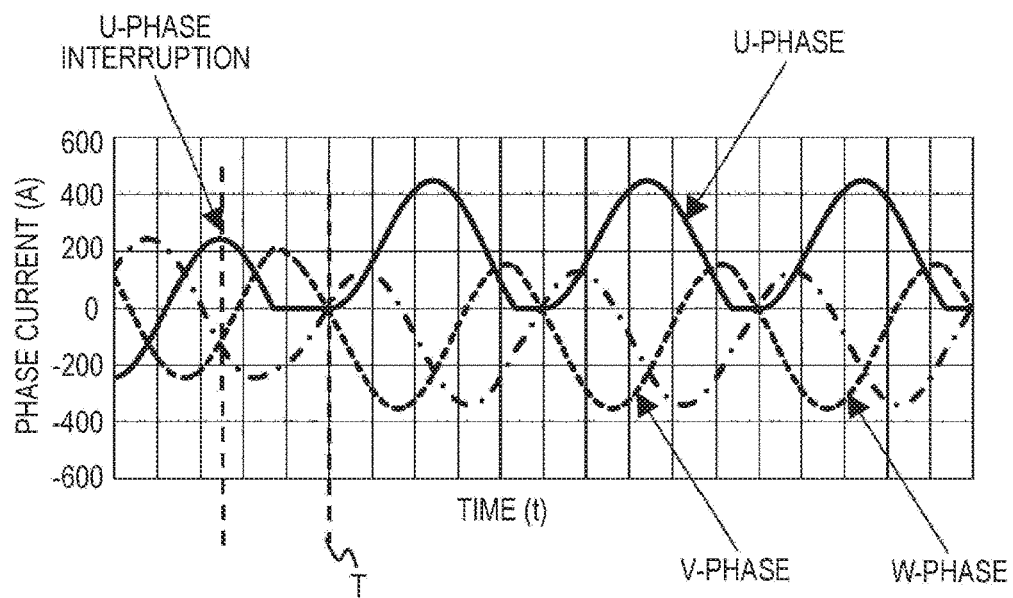
FIG. 3A is a diagram showing a change in phase current when a switching element of one phase is interrupted in accordance with an inverter control device according to the first embodiment.
Figure 3B:
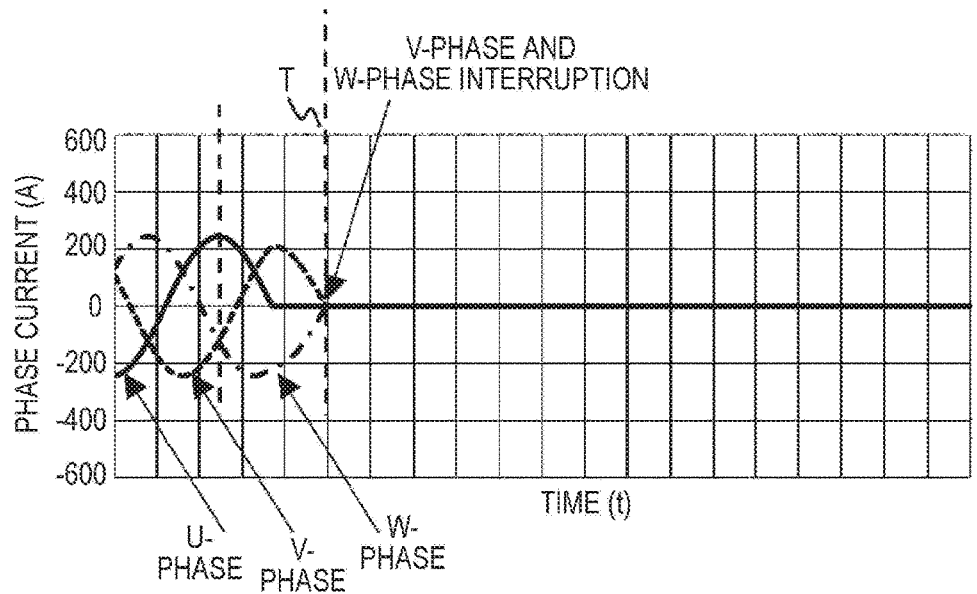
FIG. 3B is a diagram showing a change in phase current when switching to an all-phase interruption state in accordance with the inverter control device according to the first embodiment.
Figure 4A:
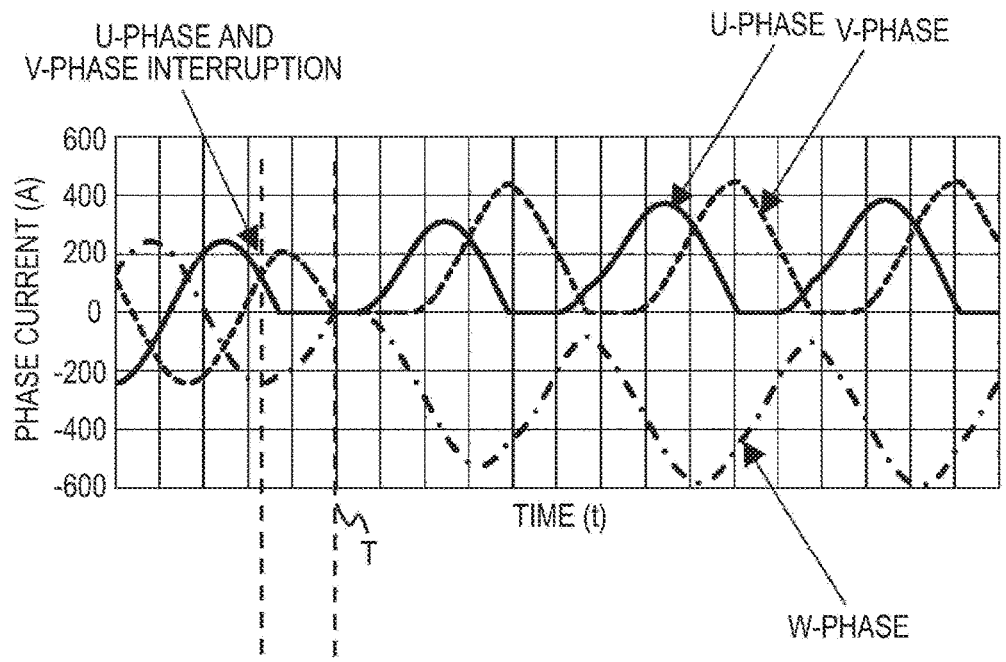
FIG. 4A is a diagram showing a change in phase current when switching elements of two phases are interrupted in accordance with the inverter control device according to the first embodiment.
Figure 4B:
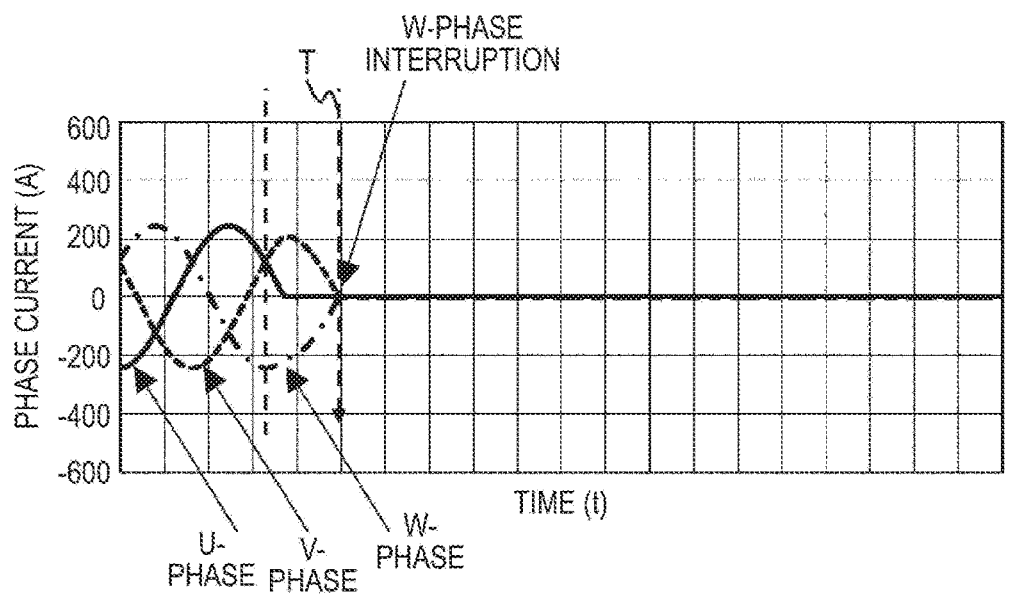
FIG. 4B is a diagram showing a change in phase current when switching to an all-phase interruption state in accordance with the inverter control device according to the first embodiment.
Figure 5:
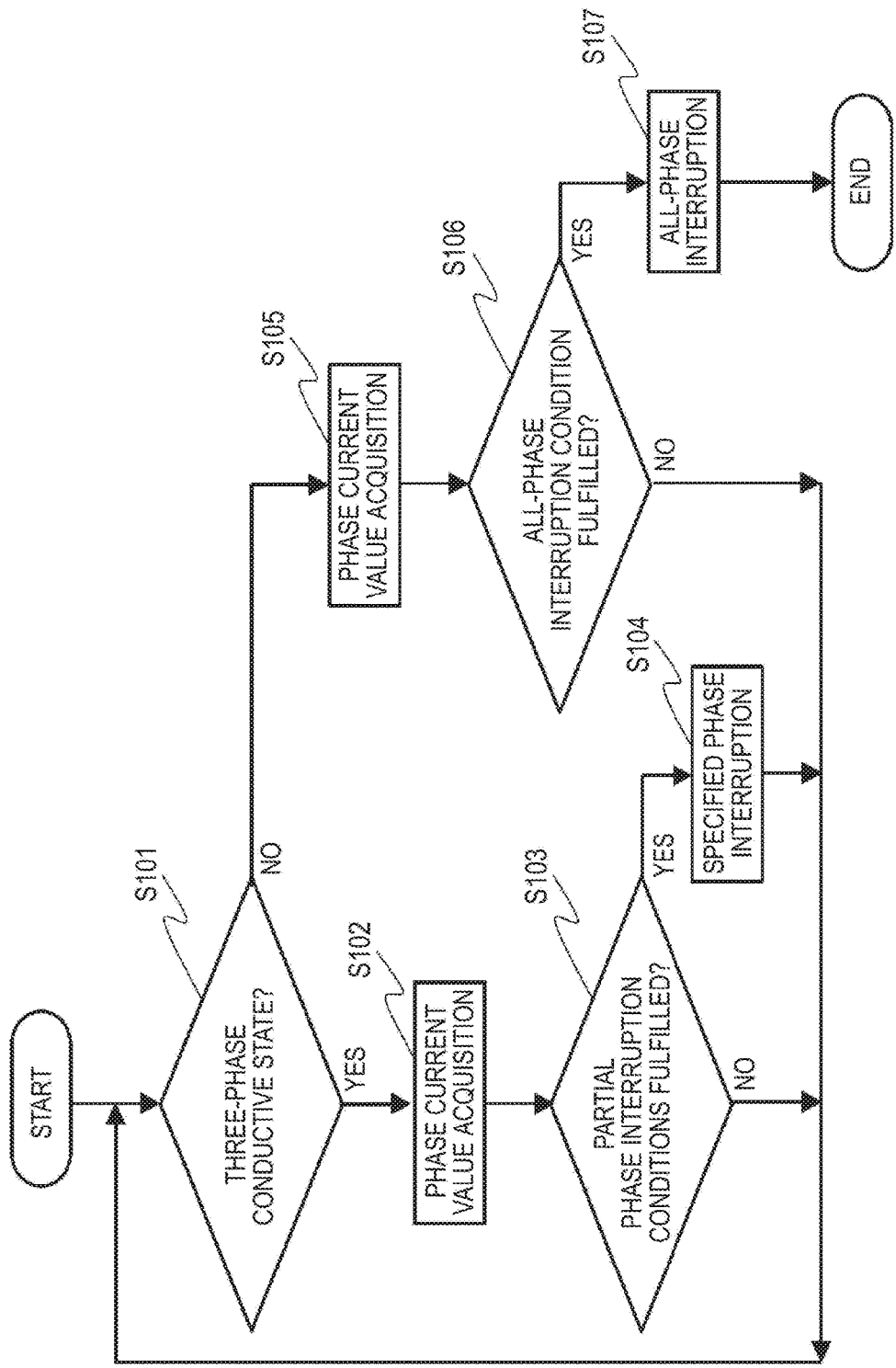
FIG. 5 is a flowchart showing a control method of an inverter that restricts a leap in a direct current bus voltage in accordance with the inverter control device according to the first embodiment.
Figure 7A:
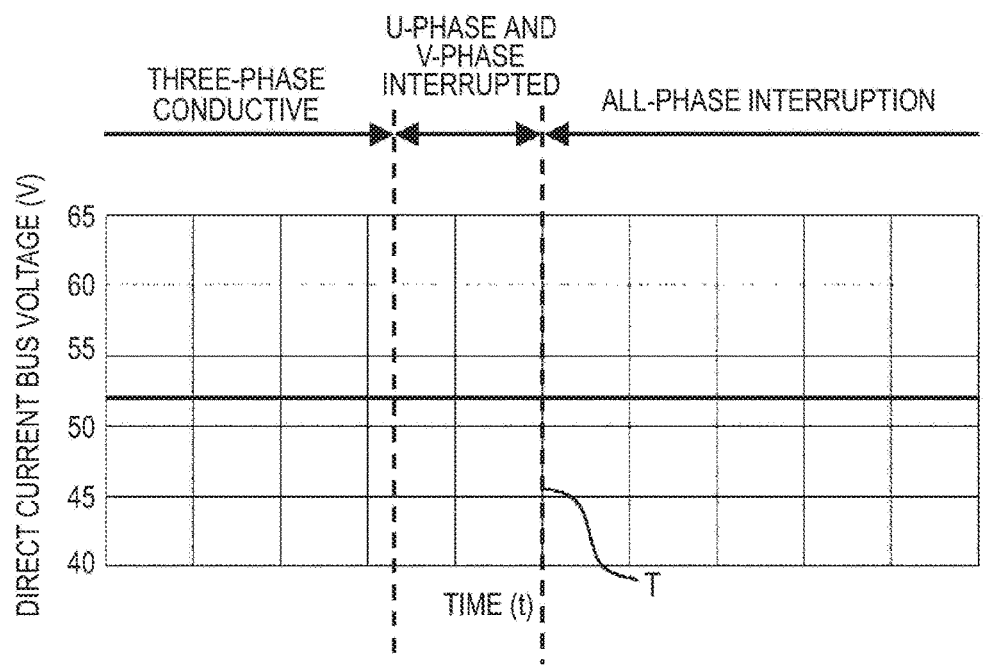
FIG. 7A is a diagram showing a fluctuation in direct current bus voltage when an all-phase interruption is executed from a three-phase conductive state via a partial phase interruption in accordance with the inverter control device according to the first embodiment.
Figure 7B:
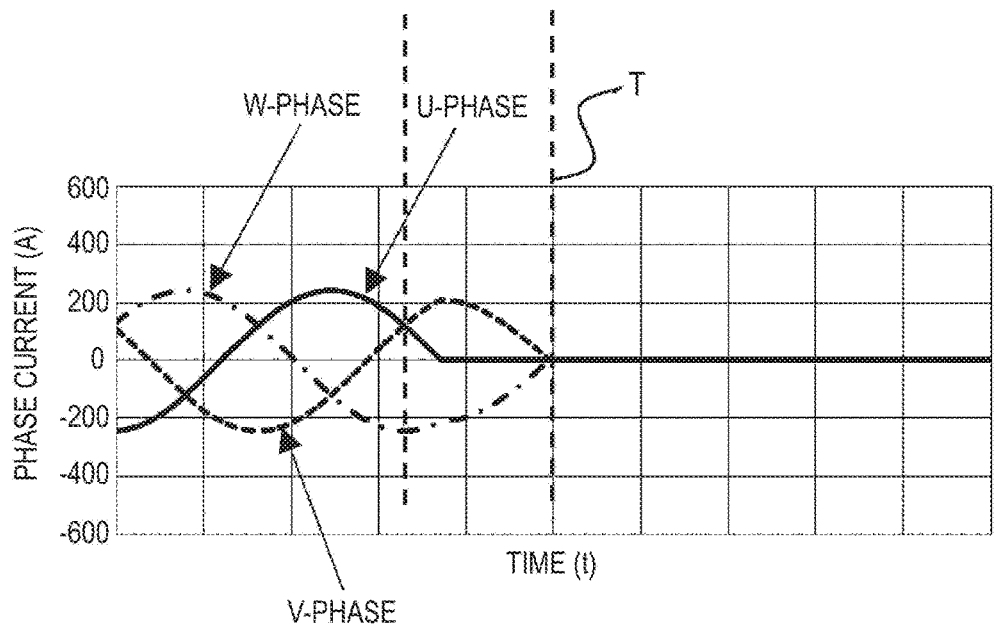
FIG. 7B is a diagram showing a fluctuation in phase current when an all-phase interruption is executed from a three-phase conductive state via a partial phase interruption in accordance with the inverter control device according to the first embodiment.

FIG. 1 is a schematic configuration diagram of a motor control system including an inverter control device according to a first embodiment, and FIG. 2 is a diagram showing a relationship between electrical angle and phase current in a three-phase conductive state. FIGS. 3A and 3B are diagrams showing examples of a change in phase current when a switching element of one phase is interrupted in the three-phase conductive state, and FIGS. 4A and 4B are diagrams showing examples of a change in phase current when switching elements of two phases are interrupted. FIG. 5 is a flowchart showing a control method of an inverter that restricts a leap in a direct current bus voltage. FIG. 6 is a diagram showing a relationship between a partial phase interruption condition and an interrupted phase. Also, FIG. 7A is a diagram showing a fluctuation in direct current bus voltage when all phases are interrupted from the three-phase conductive state via a partial phase interruption. FIG. 7B is a diagram showing a fluctuation in phase current when all phases are interrupted from the three-phase conductive state via a partial phase interruption.

As shown in FIG. 1, a motor control system 1 includes a permanent magnet synchronous motor 100, an inverter 101 that supplies three phases of drive current to the permanent magnet synchronous motor 100, a current sensor 107, which is phase current detecting means that detects a current of each of three phases of the permanent magnet synchronous motor 100, an inverter control device 110 that controls the inverter 101, a direct current power supply 106 that supplies direct current power to the inverter 101, a direct current bus 105 that energizes by connecting the direct current power supply 106 and the inverter 101, and a smoothing capacitor 104, connected between the direct current bus 105 and a ground, that smoothes an absorption of surge voltage generated when controlling the inverter 101, and smoothes power supply voltage when power running or regenerating.

Herein, the inverter 101 is configured of three phases wherein an upper arm (positive electrode side) switching element 102s and lower arm (negative electrode side)

switching element 103s are a pair, and diodes 102d and 103d connected in anti-parallel to the switching elements 102s and 103s respectively of each phase, and by the switching elements 102s and 103s of each phase being controlled so as to be conductive or interrupted (on or off) by the inverter control device 110, direct current power supplied from the direct current power supply 106 is converted into three-phase alternating current power, or three-phase alternating current power generated in the permanent magnet synchronous motor 100 when regenerating is converted into direct current power.

Also, as shown in FIG. 1, the inverter control device 110 includes a phase current value acquisition unit 111 that acquires a phase current value based on an output signal from the current sensor 107, a phase current value polarity determination unit 112, which is phase current value polarity determination means that determines whether a current value of each phase output from the phase current value acquisition unit 111 is positive or negative, a phase current value zero determination unit 113, which is phase current value zero determination means that determines whether or not a sum of absolute values of the current values of each phase output from the phase current value acquisition unit 111 is equal to or less than a predetermined value, and an inverter control unit 114, which is inverter control means that outputs a control signal for conductivity or interruption to the upper arm switching element 102s and lower arm switching element 103s of the inverter 101 based on output signals of the phase current value polarity determination unit 112 and phase current value zero determination unit 113.

Firstly, a description will be given of a principle of an action of a method of controlling an inverter that restricts a leap in the voltage of the direct current bus 105 using the inverter control device 110 according to this embodiment.

A method of controlling an inverter that restricts a leap in the voltage of the direct current bus 105 is a method that prevents current from flowing into the smoothing capacitor 104 by causing phase current flowing in a three-phase conductive state to flow back into the permanent magnet synchronous motor 100. When executing control of the inverter 101, which restricts a leap in the voltage of the direct current bus 105, it is a precondition that the voltage of the direct current bus 105 is higher than an induction voltage caused by the permanent magnet synchronous motor 100, because of which no current flows into the smoothing capacitor 104 in a steady state in which the phase current value is "0" (zero), even when the switching elements 102s and 103s of all phases are interrupted. Before reaching the steady state, however, and depending on a phase of the phase currents of the switching elements 102s and 103s of all phases when interrupted, a voltage drop occurs due to the phase current flowing, a terminal voltage of the inverter 101 becomes greater than the voltage of the direct current bus 105, and current flows into the smoothing capacitor 104.

In order to prevent this phenomenon of current flowing into the smoothing capacitor 104, it is sufficient when a certain phase is interrupted that the value of the phase current flowing through the phase is "O". Herein, as the diodes 102d and 103d are connected in anti-parallel to the switching elements 102s and 103s of each phase, no change occurs in the phase current value in a period in which the phase current is flowing in the forward direction of the diodes 102d and 103d, even when the switching elements 102s and 103s are interrupted. That is, provided that the switching elements 102s and 103s are interrupted in a period in which the phase current is flowing in the forward direction of the diodes 102d and 103d, the phase current is blocked by the diodes 102d and 103d after the phase current value next reaches "0", because of which this state is continued for a certain period. Consequently, by the switching elements 102s and 103s being interrupted in a period in which the phase current is flowing in the forward direction of the diodes 102d and 103d, an advantage equivalent to the switching elements 102s and 103s being interrupted at the instant the phase current value reaches "0" can be obtained.

Herein, when the switching elements 102s of the three phases in the upper arm are conductive, a period in which the phase current flows in the forward direction of the diode 102d is a period when the phase current value is negative, and conversely, when the switching elements 103s of the three phases in the lower arm are conductive, a period in which the phase current flows in the forward direction of the diode 103d is a period when the phase current value is positive. Herein, in a three-phase conductive state, either the upper arm switching element 102s or lower arm switching element 103s of the inverter 101 is conductive. Consequently, a description will be given hereafter of a case in which the switching elements 103s of the three phases in the lower arm are conductive. The same thinking can be applied in a case in which the switching elements 102s of the three phases in the upper arm are conductive.

When in a three-phase conductive state, the kind of three-phase alternating current shown in FIG. 2 flows from the permanent magnet synchronous motor 100. At this time, the phase current value of one of the three phases is constantly positive, and a period in which the phase current values of two phases are simultaneously positive exists. Also, provided that the phase current value is positive, an action is the same even when the number of phases in which the switching element 103s is interrupted differs. Consequently, there is a case in which the switching element 103s of one phase is interrupted, and a case in which the switching elements 103s of two phases are simultaneously interrupted, or separately interrupted in an interval in which the phase current values of both phases are positive. Because of this, firstly, a partial phase interruption wherein the switching elements 103s of one or two of the three phases of switching elements 103s are interrupted is executed, and after a certain time elapses, an all-phase interruption wherein the switching elements 103s of the remaining phases are interrupted is executed.

FIGS. 3A and 3B are diagrams showing examples of a change in phase current when a switching element of one phase is interrupted in a partial phase interruption.

FIG. 3A shows a waveform of the current of each phase when the U-phase switching element 103s is interrupted at a timing shown in the diagram. As shown in the diagram, current flows back into the other V-phase and W-phase after the U-phase current value reaches "0" after the interruption, because of which the absolute values of the V-phase and W-phase current values are equal, and the reference signs are reversed. Further, the V-phase and W-phase current values become practically "0" after a certain time elapses, and a point T at which the current values of all three phases are practically "0" appears. Owing to the V-phase and W-phase switching elements 103s being interrupted at the point T, as shown in FIG. 3B, thus shifting to an all-phase interruption, no current flows into the smoothing capacitor 104, and a shift to an all-phase interruption can be made.

Also, FIGS. 4A and 4B are diagrams showing examples of a change in phase current when switching elements of two phases are interrupted in a partial phase interruption.

FIG. 4A shows a waveform of the current of each phase when the U-phase and V-phase switching elements 103s are simultaneously interrupted at a timing shown in the diagram. Current flows back into the other V-phase and W-phase after the U-phase current value reaches "0" after the interruption, in the same way as in FIG. 3A, because of which the absolute values of the V-phase and W-phase current values are equal, and the reference signs are reversed. Further, the V-phase and W-phase current values become practically "0" after a certain time elapses, and a point T at which the current values of all three phases are practically "0" appears. Owing to the W-phase switching element 103s being interrupted at the point T, as shown in FIG. 4B, thus shifting to an all-phase interruption, no current flows into the smoothing capacitor 104, and a shift to an all-phase interruption can be made.

Next, using the flowchart shown in FIG. 5, a description will be given of a method of controlling an inverter that restricts a leap in the voltage of the direct current bus 105 using the inverter control device 110 according to this embodiment. Herein, a description will be given of a case in which the lower arm switching elements 103s are in a three-phase conductive state.

The flowchart shows one example of a method, executed by the inverter control unit 114, of controlling an inverter that restricts a leap in the voltage of the direct current bus 105 when shifting from a three-phase conductive state via a partial phase interruption to an all-phase interruption.

In the flowchart, it is a precondition that the switching elements 103s of the inverter 101 are already in a three-phase conductive state. When a control method for restricting a leap in the voltage of the direct current bus 105 is executed, it is firstly determined whether or not the permanent magnet synchronous motor 100 is in a three-phase conductive state (step S101). Herein, when it is determined from the inverter control unit 114 that the switching elements 103s of the inverter 101 are in a three-phase conductive state, a phase current value is acquired from an output signal of the current sensor 107 by the phase current value acquisition unit 111 (step S102).

Subsequently, in step S103, it is determined whether or not conditions are fulfilled for a partial phase interruption wherein the switching element 103s of one or two of the three phases is interrupted in order to cause current to flow back into the permanent magnet synchronous motor 100. The fulfillment of the partial phase interruption conditions, as previously described, is determined by two factors, those being that either the upper arm switching elements 102s or lower arm switching elements 103s are in a three-phase conductive state, and that the number of phases in the partial interruption is either one or two. Consequently, categorization into four cases can be carried out (refer to FIG. 6).

Herein, FIG. 6 shows a relationship between a three-phase conductive state before shifting and partial phase interruption conditions. That is, FIG. 6 shows phases to be interrupted determined from partial phase interruption conditions (the polarity of the current value of each phase) in response to the number of phases (one phase or two phases) to be interrupted at first in the partial phase interruption in accordance with a three-phase conductive state (which of the upper arm switching elements 102s and lower arm switching elements 103s are in a three-phase conductive state). As previously described, four cases are conceivable, but the number of phases to be interrupted can be selected in advance in accordance with an application or object.

In step S103, it is determined by the phase current value polarity determination unit 112 whether or not the phase current value is positive in a predetermined number of interrupted phases (phases in which the current value is positive, as this is a case in which the lower arm is three-phase conductive), and when it is determined that the partial phase interruption conditions are fulfilled, interruption of the switching element 103s of a specified phase is executed by the inverter control unit 114 (step S104), and the process returns to step S101. Also, when it is determined that the partial phase interruption conditions are not fulfilled, the process returns without further action to step S101. In existing technology, partial phase interruption conditions should be fixed based on whether current is flowing in the forward direction in the diodes 102d and 103d connected in anti-parallel to the switching elements 102s and 103s, but in this embodiment, the polarity of the phase current value is determined by the phase current value polarity determination unit 112 from an output signal of the current sensor 107, and the partial phase interruption conditions are fixed based on the polarity of the phase current value. The reason the partial phase interruption conditions and interrupted phases differ between a case in which the upper arm is three-phase conductive and a case in which the lower arm is three-phase conductive in FIG. 6 is that the relationship between the forward direction of the diodes 102d and 103d and the polarity of the phase current value obtained by the phase current value polarity determination unit 112 is reversed between the case in which the upper arm is three-phase conductive and the case in which the lower arm is three-phase conductive. Herein, the direction in which current flows from the inverter 101 to the permanent magnet synchronous motor 100 is taken to be positive.

When it is determined in step S101 that there is no three-phase conductive state, the phase current value is acquired by the phase current value acquisition unit 111 from an output signal of the current sensor 107 (step S105). Furthermore, in step S106, it is determined by the phase current value zero determination unit 113 whether or not the phase current value fulfils an all-phase interruption condition for shifting to an all-phase interruption. The all-phase interruption condition is whether or not the current values of the three phases are in the vicinity of "0". Specifically, as one example of determining whether or not the current values of the three phases are in the vicinity of "0", determining whether or not the sum of the absolute values of the current values of the three phases is equal to or less than a predetermined value can be considered. Herein, it is sufficient that a value such that a leap in voltage occurring in the direct current bus does not damage the switching element 103s, even when all phases are interrupted, is set as a predetermined value such that the current values of the three phases are in the vicinity of "0".

When it is determined that the all-phase interruption condition is fulfilled, interruption of the switching elements 103s of all phases of the inverter 101 (interruption of remaining phases other than phases interrupted in the partial phase interruption) is executed by the inverter control unit 114 (step S107), whereby the process is ended. Also, when it is determined that the all-phase interruption condition is not fulfilled, the process returns without further action to step S101.

Figure 8A:
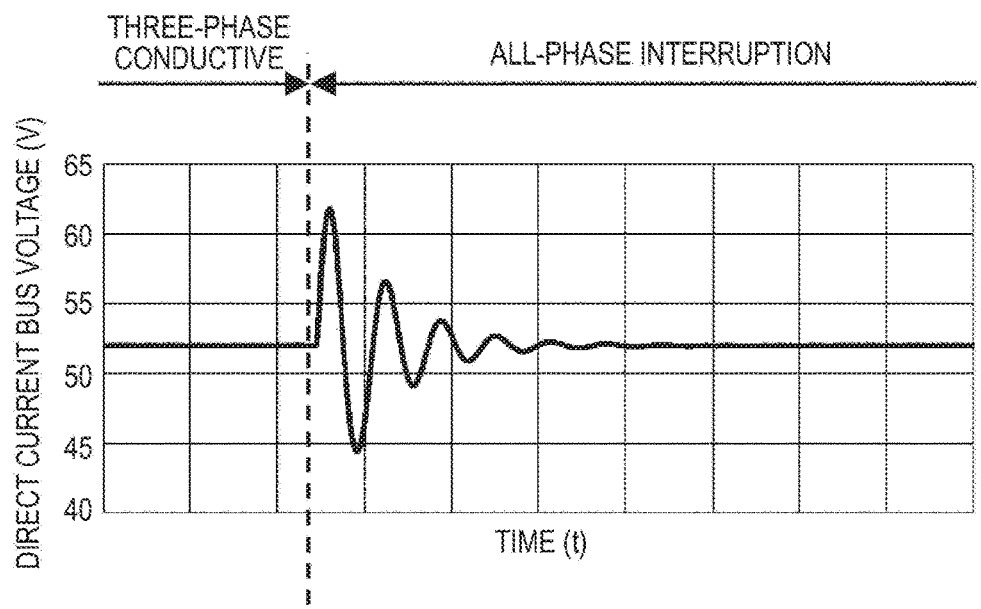
FIG. 8A is a diagram showing a fluctuation in direct current bus voltage when an all-phase interruption is executed from a three-phase conductive state in accordance with an existing control method.
Figure 8B:
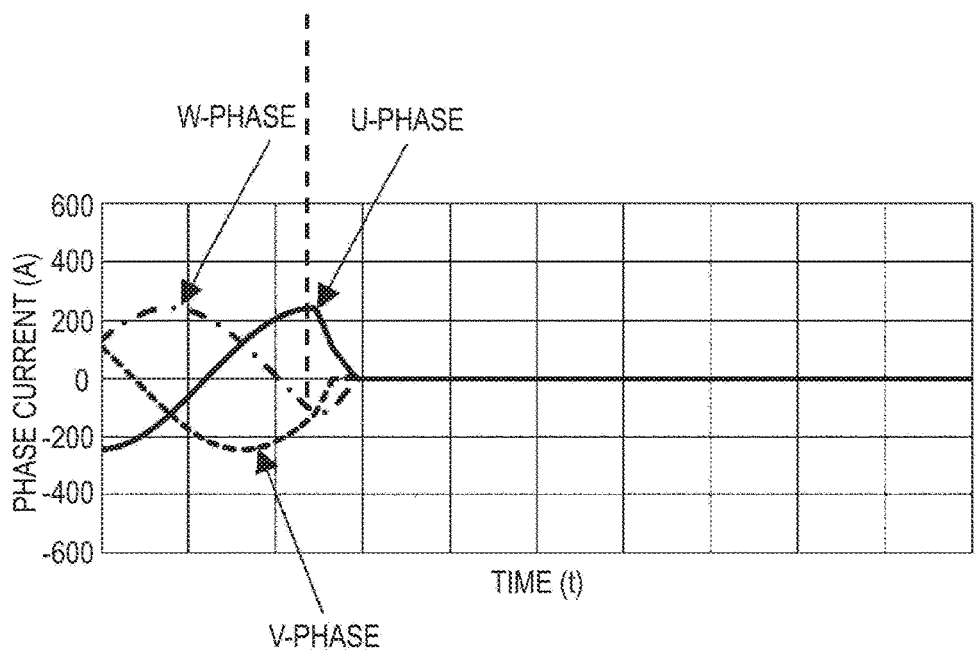
FIG. 8B is a diagram showing a fluctuation in phase current when an all-phase interruption is executed from a three-phase conductive state in accordance with an existing control method.

FIG. 7A is a diagram showing a fluctuation in voltage occurring in the direct current bus 105 when an all phase-interruption from a three-phase conductive state via a partial phase interruption is executed by the inverter control device 110 according to the first embodiment as an aspect of the control method for restricting a leap in the voltage of the direct current bus 105. Also, FIG. 7B is a diagram showing a fluctuation in the current of the three phases when an all phase-interruption from a three-phase conductive state via a partial phase interruption is executed by the inverter control device 110 according to the first embodiment as an aspect of the control method for restricting a leap in the voltage of the direct current bus 105. As opposed to this, voltage generated in the direct current bus 105 when an all-phase interruption is executed from a three-phase conductive state in accordance with an existing control method fluctuates as shown in FIG. 8A. Also, the current of the three phases in this case fluctuates as shown in FIG. 8B. When comparing FIGS. 7A and 8A, no leap in the voltage of the direct current bus 105 is observed when using the control method of the inverter 101 according to this embodiment, and it can be seen that voltage fluctuation is being restricted. As shown in FIG. 7A, no voltage fluctuation occurs in the direct current bus 105, because of which it is understood that the switching element 103s of the inverter 101 can be protected from damage.

In this way, the inverter control device according to the first embodiment is such that when executing an all-phase interruption from a three-phase conductive state, phases to be interrupted are determined from the polarity of a phase current value acquired by a current sensor provided in a permanent magnet synchronous motor, and a partial phase interruption is executed, after which the all-phase interruption is executed, because of which there is a remarkable advantage in that a leap in the voltage of a direct current bus can be restricted, whereby a switching element configuring an inverter can be protected from damage.

Second Embodiment

Figure 9:
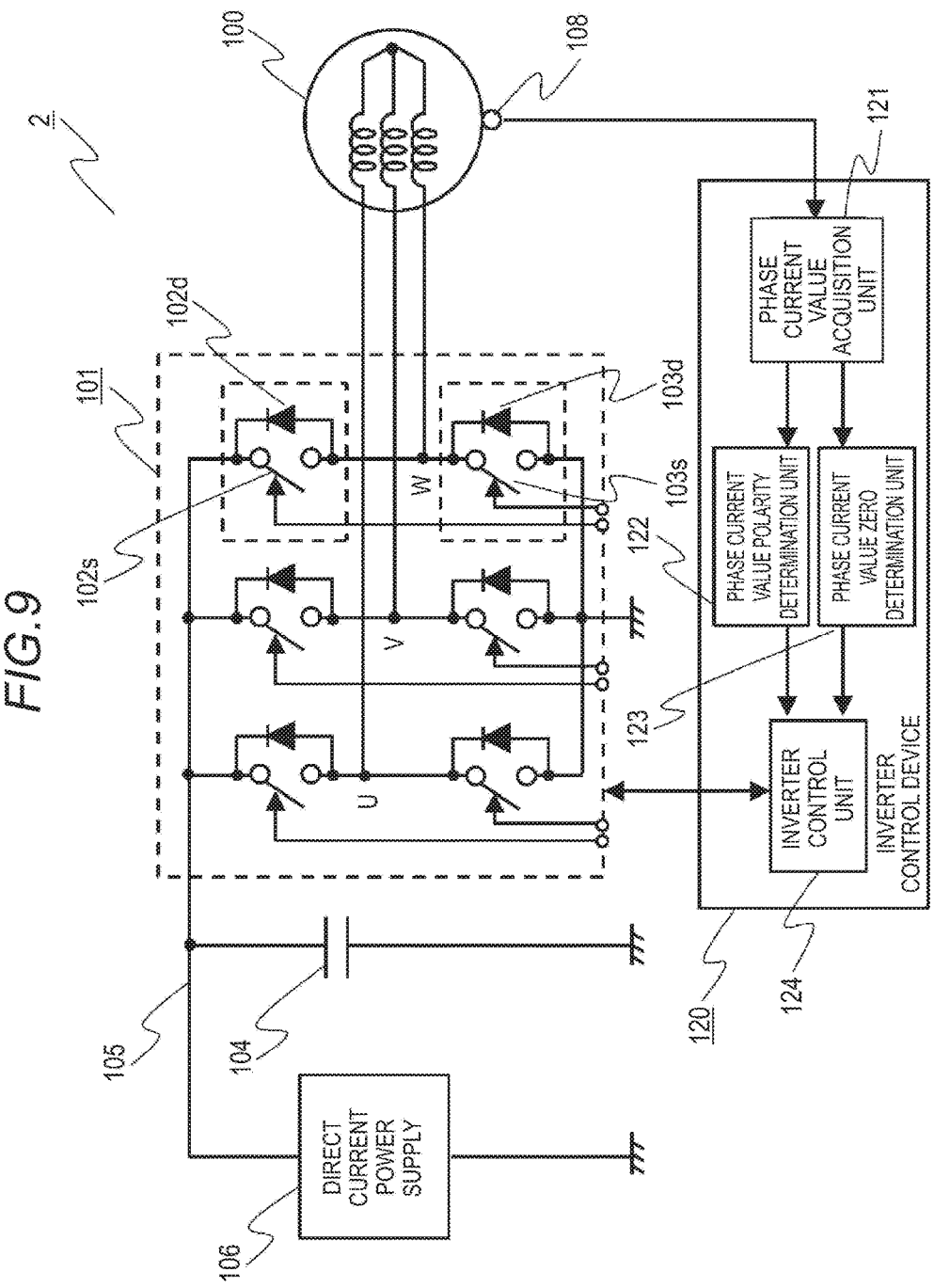
FIG. 9 is a schematic configuration diagram of a motor control system including an inverter control device according to a second embodiment of the invention.

FIG. 9 is a schematic configuration diagram of a motor control system including an inverter control device according to a second embodiment. A difference between the inverter control device according to the second embodiment and the inverter control device according to the first embodiment is that whereas the inverter control device 110 of the first embodiment is such that the current sensor 107 is provided as phase current detecting means that detects the current of each of the three phases of the permanent magnet synchronous motor 100, as shown in FIG. 1, an inverter control device 120 of a motor control system 2 of the second embodiment is such that a rotation angle sensor 108 that detects a rotation angle of a rotor of the permanent magnet synchronous motor 100 is provided in place of the current sensor 107 as phase current detection means, as shown in FIG. 9, and a phase current value acquisition unit 121 acquires a phase current value from an electrical angle based on an output signal of the rotation angle sensor 108. As other components of the motor control system 2, including a phase current value polarity determination unit 122 corresponding to the phase current value polarity determination unit 112 and a phase current value zero determination unit 123 corresponding to the phase current value zero determination unit 113, are the same as in FIG. 1 of the first embodiment, a description thereof will be omitted.

Figure 10:
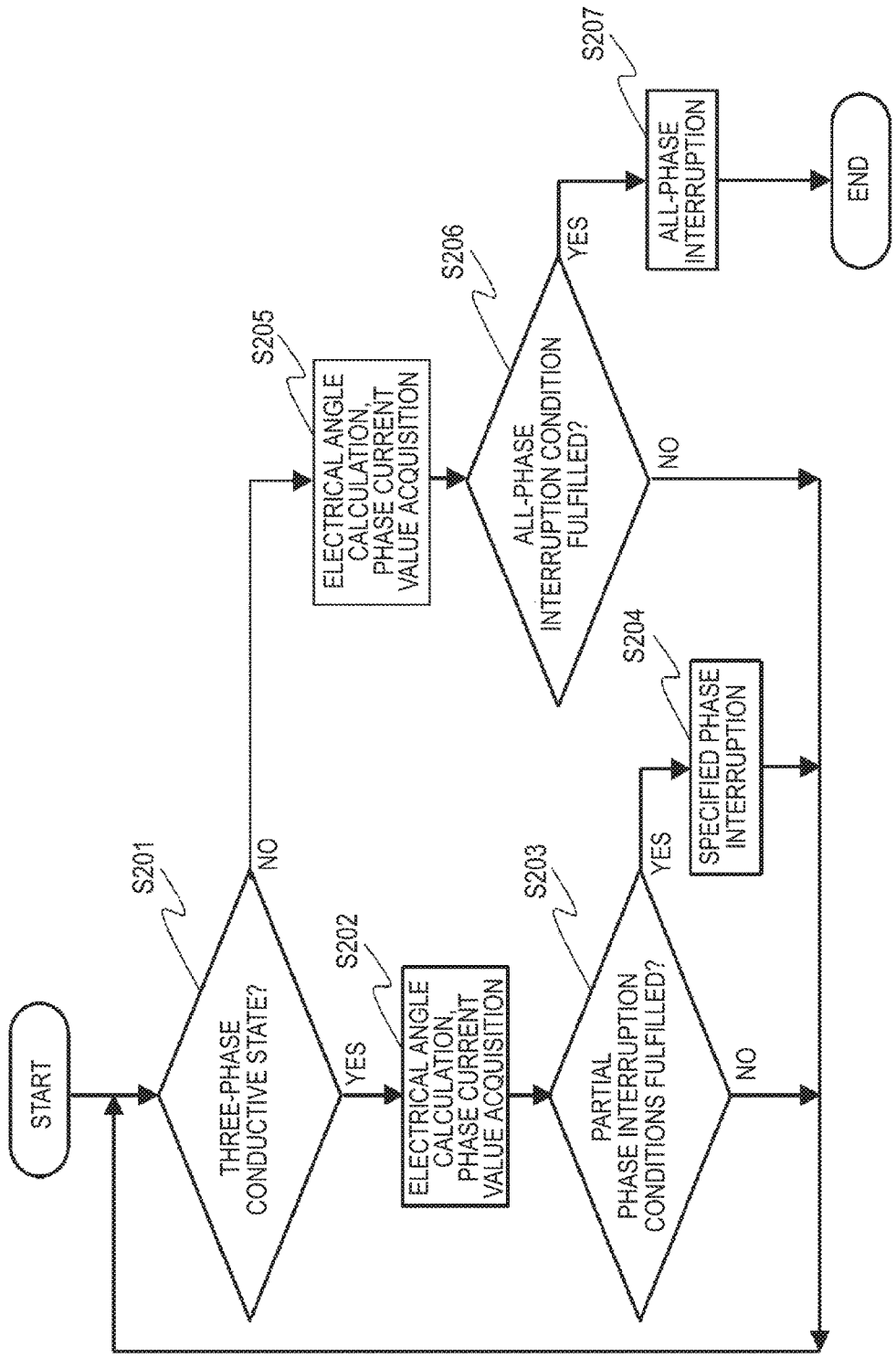
FIG. 10 is a flowchart showing a control method of an inverter that restricts a leap in a direct current bus voltage in accordance with the inverter control device according to the second embodiment.

Also, FIG. 10 is a flowchart showing a control method of an inverter that restricts a leap in a direct current bus voltage. FIG. 11 is a diagram showing a relationship between an electrical angle and phase current value polarity in a three-phase conductive state. FIG. 12 is a diagram showing a relationship between a partial phase interruption and an electrical angle of each phase in an all-phase interruption condition.

Next, using the flowchart shown in FIG. 10, a description will be given of a method of controlling an inverter that restricts a leap in the voltage of the direct current bus 105 using the inverter control device 120 according to the second embodiment. Herein, a description will be given of a case in which the lower arm switching elements 103s are in a three-phase conductive state.

The flowchart shows one example of a method, executed by an inverter control unit 124, of controlling an inverter that restricts a leap in the voltage of the direct current bus 105 when shifting from a three-phase conductive state via a partial phase interruption to an all-phase interruption.

In the flowchart, it is a precondition that the switching elements 103s of the inverter 101 are already in a three-phase conductive state. When a control method for restricting a leap in the voltage of the direct current bus 105 is executed, it is firstly determined whether or not the permanent magnet synchronous motor 100 is in a three-phase conductive state (step S201). Herein, when it is determined from the inverter control unit 124 that the switching elements 103s of the inverter 101 are in a three-phase conductive state, an electrical angle is calculated from the rotor rotation angle by the phase current value acquisition unit 121 from an output signal of the rotation angle sensor 108, and based on the electrical angle, the phase current value is acquired using the relationship between electrical angle and phase current value in a three-phase conductive state shown in FIG. 2 (step S202).

Subsequently, in step S203, it is determined whether or not conditions are fulfilled for a partial phase interruption wherein the switching element 103s of one or two of the three phases is interrupted in order to cause current to flow back into the permanent magnet synchronous motor 100. The partial phase interruption conditions are the same as in the description of the first embodiment (refer to FIG. 6). When determining the partial phase interruption conditions, the polarity of the current value of each phase is obtained by referring to the relationship between electrical angle and phase current value polarity in a three-phase conductive state shown in FIG. 11.

In step S203, it is determined by the phase current value polarity determination unit 122 whether or not the phase current value is positive in a predetermined number of interrupted phases (phases in which the current value is positive, as this is a case in which the lower arm is three-phase conductive), and when it is determined that the partial phase interruption conditions are fulfilled, interruption of the switching element 103s of a specified phase is executed by the inverter control unit 124 (step S204), and the process returns to step S201. Also, when it is determined that the partial phase interruption conditions are not fulfilled, the process returns without further action to step S201.

When it is determined in step S201 that there is no three-phase conductive state, the phase current value is acquired by the phase current value acquisition unit 121 from an output signal of the rotation angle sensor 108, using the relationship between electrical angle θ and phase current in a three-phase conductive state shown in FIG. 2 (step S205). Furthermore, in step S206, it is determined by the phase current value zero determination unit 123 whether or not the phase current value fulfils an all-phase interruption condition for shifting to an all-phase interruption. The all-phase interruption condition is whether or not the current values of the three phases are in the vicinity of "0". Specifically, as one example of determining whether or not the current values of the three phases are in the vicinity of "0", determining whether or not the sum of the absolute values of the current values of the three phases is equal to or less than a predetermined value can be considered. That is, it is sufficient that it is determined herein whether or not a phase current electrical angle θ such that the sum of the absolute values of the current values of the three phases is equal to or less than a predetermined value is within a predetermined range. Herein, it is sufficient that a value such that a leap in voltage occurring in the direct current bus does not damage the switching element 103s, even when all phases are interrupted, is set as an electrical angle θ such that the current values of the three phases are in the vicinity of "0". That is, in the second embodiment, it is sufficient that the electrical angle θ satisfies the all-phase interruption condition shown in FIG. 12.

Herein, FIG. 12 shows a relationship between a partial phase interruption in a three-phase conductive state before shifting and an all-phase interruption condition. Herein, as an all-phase interruption condition, it is sufficient that the electrical angle θ of the current of an interrupted phase in a state of partial phase interruption satisfies the condition shown in FIG. 12. That is, FIG. 12 shows the electrical angle θ at which the current values of the three phases cross zero when each phase is interrupted. A width α in FIG. 12 is in the region of 15°. Actually, it is sufficient that the width α is determined experimentally. This is because when a two-phase interruption is executed first, the point T at which the current values of the three phases are practically "0" has a period of a predetermined length, as shown in FIG. 4A, and it is sufficient to shift to an all-phase interruption within this period.

When it is determined that the all-phase interruption condition is fulfilled, interruption of the switching elements 103s of all phases of the inverter 101 (interruption of remaining phases other than phases interrupted in the partial phase interruption) is executed by the inverter control unit 124 (step S207), whereby the process is ended. Also, when it is determined that the all-phase interruption condition is not fulfilled, the process returns without further action to step S201.

Because of this, the control method for restricting a leap in the voltage of the direct current bus 105 using the inverter control device 120 according to this embodiment is also such that, in the same way as in the case of the first embodiment, no leap in voltage occurring in the direct current bus 105 is observed when an all-phase interruption is executed from a three-phase conductive state via a partial phase interruption, as shown in FIGS. 7A and 7B, and voltage fluctuation can be restricted. Because of this, the switching element 103s of the inverter 101 can be protected from damage.

It not being necessary that the all-phase interruption condition shown in FIG. 12 is strictly satisfied when executing the all-phase interruption, the electrical angle θ may be outside the range of the condition provided that a leap in the voltage of the direct current bus 105 is within an allowable range.

In this way, the inverter control device according to the second embodiment is such that when executing an all-phase interruption from a three-phase conductive state, phases to be interrupted are determined from the polarity of a phase current value obtained from a relationship between a phase current value and an electrical angle in a rotation angle of a rotor of a permanent magnet synchronous motor, and a partial phase interruption is executed, after which the all-phase interruption is executed, because of which, in the same way as in the first embodiment, there is a remarkable advantage in that a leap in the voltage of a direct current bus can be restricted, whereby a switching element configuring an inverter can be protected from damage.

In this embodiment, an example configured of one inverter and one permanent magnet synchronous motor with respect to one direct current power supply is shown as the inverter control device of the invention, but a configuration such that a multiple of inverters are connected to a direct current bus of one direct current power supply can also be adopted. In this case, an ordering of the multiple of inverters is carried out under the condition of step S101 shown in FIG. 5, and the inverters are caused to shift individually, whereby a leap in the voltage of the direct current bus can be restricted further than when switching all the inverters simultaneously.

Also, a semiconductor switching element such as a transistor or MOSFET can be applied as a switching element used in an inverter in the inverter control device of the invention.

Also, the embodiments of the invention can be freely combined, and each embodiment can be modified or abbreviated as appropriate, without departing from the scope of the invention.

Identical reference signs in the drawings indicate identical or corresponding portions.

Various modifications and alterations of this invention will be apparent to those skilled in the art without departing from the scope and spirit of this invention, and it should be understood that this is not limited to the illustrative embodiments set forth herein.

Figure 13:
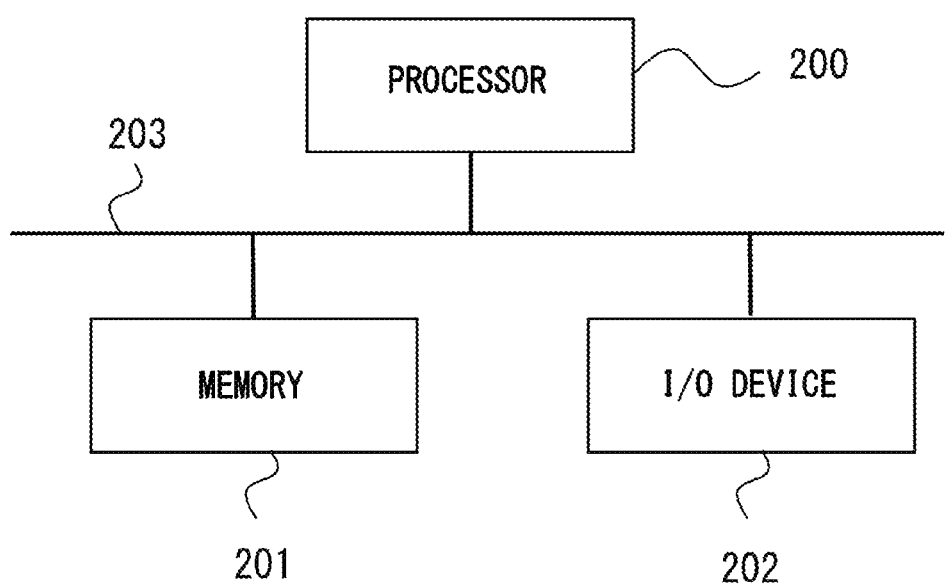
FIG. 13 is a hardware configuration diagram for realizing a block diagram according to an embodiment of the present invention.

Each of the functional blocks shown in FIG. 1 and FIG. 9 is realized by the hardware shown in FIG. 13. That is, a processor 200, a memory 201 for storing programs and data, and an input/output device 202 such as a sensor are connected via a data bus 203, and data processing and data transmission are performed under the control of the processor 200.

What is claimed is:

1. An inverter control device, comprising:
a phase current detection unit provided in a multi-phase motor and detecting a phase current;
a phase current value acquisition unit that acquires a phase current value from the phase current detection unit;
a phase current value polarity determination unit that determines a polarity of the phase current value of each phase;
a phase current value zero determination unit that determines whether or not a sum of absolute values of the phase current values of each phase is equal to or less than a predetermined value; and
an inverter control unit that controls switching elements of an inverter that drives the multi-phase motor, wherein
the inverter control unit, when either one of the switching element on a positive electrode side of the inverter and the switching element on a negative electrode side is conductive, determines a phase of which the switching element is to be interrupted based on the polarity of the phase current value, interrupts the relevant switching element, and furthermore, interrupts the switching element of a remaining phase when the sum of absolute values of the phase current values of the switching elements of all phases is equal to or less than a predetermined value.

2. The inverter control device according to claim 1, wherein the phase current detection unit is a current sensor that detects a phase current of the multi-phase motor, and the phase current value acquisition unit acquires the phase current value from the current sensor.

3. The inverter control device according to claim 1, wherein the phase current detection unit is a rotation angle sensor that detects a rotation angle of a rotor of the multi-phase motor, and the phase current value acquisition unit calculates an electrical angle from the rotation angle, and acquires the phase current value based on the electrical angle.

4. The inverter control device according to claim 1, wherein the switching element of one or two phases in which the phase current value is negative is interrupted when the switching element on the positive electrode side is conductive, and the switching element of one or two phases in which the phase current value is positive is interrupted when the switching element on the negative electrode side is short-circuited.

5. The inverter control device according to claim 2, wherein the switching element of one or two phases in which the phase current value is negative is interrupted when the switching element on the positive electrode side is conductive, and the switching element of one or two phases in which the phase current value is positive is interrupted when the switching element on the negative electrode side is short-circuited.

6. The inverter control device according to claim 3, wherein the switching element of one or two phases in which the phase current value is negative is interrupted when the switching element on the positive electrode side is conductive, and the switching element of one or two phases in which the phase current value is positive is interrupted when the switching element on the negative electrode side is short-circuited.

7. An inverter control method of, when either one of a switching element on a positive electrode side of an inverter that drives a multi-phase motor and a switching element on a negative electrode side is conductive, acquiring a phase current value of the multi-phase motor, determining a phase of which the switching element is to be interrupted based on a polarity of the acquired phase current value, interrupting the relevant switching element, and furthermore, interrupting the switching element of a remaining phase when a sum of absolute values of the phase current values of the switching elements of all phases is equal to or less than a predetermined value.

* * * * *